United States Patent [19]

Fujita et al.

[11] Patent Number: 5,156,941
[45] Date of Patent: Oct. 20, 1992

[54] METHOD OF PRODUCING AN OPTICAL OR MAGNETO-OPTICAL RECORDING CARD AND TRANSFER TYPE OPTICAL OR MAGNETO-OPTICAL RECORDING MEDIUM

[75] Inventors: Minoru Fujita; Yoichi Fukushima; Toshio Haga, all of Tokyo, Japan

[73] Assignee: Kyodo Printing Co., Ltd., Tokyo, Japan

[21] Appl. No.: 397,609

[22] Filed: Aug. 23, 1989

Related U.S. Application Data

[62] Division of Ser. No. 63,174, Jun. 15, 1987, abandoned.

[30] Foreign Application Priority Data

Jun. 17, 1986 [JP] Japan .................. 63-141009

[51] Int. Cl.$^5$ .................. G03C 1/72; G11B 23/00
[52] U.S. Cl. .................. 430/271; 430/256;
430/258; 430/259; 430/262; 430/272; 430/273;
430/320; 430/321; 430/496; 430/945; 427/162;
427/164; 428/343; 428/344; 428/345; 428/352;
428/354; 428/900
[58] Field of Search .............. 430/945, 256, 259, 496,
430/901, 271, 272, 273, 320, 321, 262, 258;
346/135.1; 283/100, 109, 110, 101; 156/239,
235, 230, 237; 427/162, 164; 428/343, 344, 345,
352, 354, 692, 900

[56] References Cited

U.S. PATENT DOCUMENTS

| | | | |
|---|---|---|---|
| 3,644,716 | 2/1972 | Nagata et al. | 360/131 |
| 3,649,283 | 3/1972 | Christensen | 430/273 |
| 4,282,310 | 8/1981 | Edhlund | 430/259 |
| 4,284,703 | 8/1981 | Inoue et al. | 430/273 |
| 4,389,480 | 6/1983 | Franke et al. | 430/259 |
| 4,419,436 | 12/1983 | Kranser | 430/256 |
| 4,464,454 | 8/1984 | Vogt | 430/256 |
| 4,511,641 | 4/1985 | Busman et al. | 430/273 |
| 4,635,965 | 1/1987 | Vogt | 430/256 |
| 4,656,114 | 4/1987 | Cederberg et al. | 430/259 |

FOREIGN PATENT DOCUMENTS 58894 5/1985 Japan .

OTHER PUBLICATIONS

Patent Abstracts of Japan, vol. 9, No. 194, Abstract JP-A-60-58894.
Patent Abstracts of Japan, vol. 10, No. 254, Abstract of JP-A-61-80632.

*Primary Examiner*—Charles L. Bowers, Jr.
*Assistant Examiner*—Lee C. Wright
*Attorney, Agent, or Firm*—Martin A. Farber

[57] ABSTRACT

An optical or magneto-optical recording card is produced using a transfer type optical or magneto-optical recording medium. The transfer type optical or magneto-optical recording medium comprises a base film, a peeling layer, an optical or magneto-optical recording layer and a light permeable adhesive layer which are successively superimposed one above another to constitute a layered structure. A protective layer is adhered to the transfer type optical or magneto-optical recording medium with the aid of an adhesive layer and the base film is then peeled off together with the peeling layer. Next, the protective layer to which the optical or magneto-optical recording layer is adhered is adhesively attached to a card base in such a manner that the optical or magneto-optical recording layer is interposed therebetween whereby an optical or magneto-optical recording card is completely produced. The transfer type recording medium can be preserved in such a state that it is wound about a reel. Accordingly, the transfer type recording medium is adhered to the protective layer when the optical or magneto-optical recording card is produced, and thereafter it is adhered to the card base. Thus, the optical or magneto-optical recording card can be produced at a high productive efficiency.

5 Claims, 4 Drawing Sheets

METHOD OF PRODUCING AN OPTICAL OR MAGNETO-OPTICAL RECORDING CARD AND TRANSFER TYPE OPTICAL OR MAGNETO-OPTICAL RECORDING MEDIUM

RELATED APPLICATION

This application is a division of our co-pending application Ser. No. 07/063,174 filed Jun. 15, 1987 now abandoned.

BACKGROUND OF THE INVENTION

1. FIELD OF THE INVENTION

The present, invention relates to a method of producing an optical or magneto-optical recording card and a transfer type optical or mangeto-optical recording medium employable for carrying out the method.

In the recent years a number of cards in which various kinds of information are recorded are increasingly put in practical used as ID card, cash card or bank card.

2. DESCRIPTION OF THE PRIOR ART

This kind of card is required to record various kinds of, informations such as data concerning individual person, data concerning a company from which the card is issued or the like data. In the earlier age such informations were recorded using visual characters and symbols and in the later age they were recorded in response to electrical signals which were generated magnetically. However, due to rapid increase in number of card the conventional card is not in position to take adequate measures for preventing data from being falsified and moreover for the current tendency of increased volume of informations.

In view of the current situation as mentioned above a card including an optical recording layer to which the latest optical technology is applied to record informations has been developed in the recent years. This kind of card is called optical recording card.

A hitherto proposed optical recording card 1 has a basic structure as shown in FIGS. 1 and 2. Specifically, it includes an optical recording layer 4 which is interposed between a card base 2 and a transparent protective layer 3 made of transparent plastics and optical reading is carried out from the side of the protective layer 3. It should be noted that in FIG. 2 an adhesive layer is omitted. The optical recording layer 4 comprises an optical reflective layer which has optical reflection faces on which a number of data pits are formed. Reading is achieved with the use of laser beam 9 by detecting data pits each of which has a different optical reflectivity.

In order to produce optical recording cads as mentioned above a variety of technologies have been developed and in the recent years a method of producing optical recording cards with the use of transfer technique has been proposed from the viewpoint of facilitating production of optical recording cards. An example of production technique for producing optical card with the aid of transfer technique is shown in FIG. 9 and a transfer type optical recording medium is used for practicing the production technique.

Specifically, a transfer type optical recording medium 101 comprises a base film 102, a peeling layer 103, a transparent protective layer 3 made of transparent synthetic resin, an optical recording layer 4 and an adhesive layer 104 which are successively superimposed one above another. When an optical card is produced using the transfer type optical recording medium 101, the base film 102 is peeled off together with the parting layer and a card base 2 is adhesively secured to the transfer type optical recording medium 101 to achieve thermal transfer on necessary part, as shown in FIG. 10. Thus, an optical recording card 100 as shown in FIG. 11 is produced.

A method of producing an optical recording card as mentioned above is a known technique as disclosed on an official gazette of Japanese laid-open patent (official gazette of Japanese Laid-Open Patent NO. 58894/1986 issued on the day of Apr. 5, 1985).

The protective layer 3 of the transfer type optical recording medium 101 used for practicing the above-mentioned prior method of producing a conventional optical recording card constitutes an upper layer of the optical recording card 100 in order to protect the optical recording layer 4 from damage or injury and moreover reduce a rate of occurrence of error during data reading. Accordingly, the protective layer 3 is constructed by hard material having a thickness of about 400 microns. However, the fact that the protective layer 3 is constructed by thick and hard material makes it difficult to produce the transfer type optical recording medium 101 in tape-shape which can be wound about a reel. This means that it is inconvenient to handle the transfer type optical recording medium 101 when an optical card is produced.

Further, since the protective layer 3 has a heavy thickness, there is a fear that it is deformed under the effect of heat during thermal transfer and its surface loses smoothness. This leads to a cause that a rate of occurrence of error during data reading increases.

Since laser beam is adapted to pass through the protective layer when data is written in the optical recording layer or data written in the optical recording layer is read, damaged or injured protective layer or contaminated protective layer causes S/N ratio to be reduced.

SUMMARY OF THE INVENTION

Thus, the present invention has been made with the foregoing background in mind.

A first object of the present invention is to provide a method of producing an optical recording card which assures that the optical card is produced at a high production efficiency and at an inexpensive cost.

A second object of the present invention is to provide a transfer type optical recording medium usable for practicing the method of producing an optical recording card wherein the transfer type optical recording medium can assume tape-shape to be wound around a reel and moreover it is simple to be handled during a step of producing.

A third object of the present invention is to provide a method of producing an optical recording card wherein the protective layer of the optical recording card is not deformed under the effect of heat, thus it has an excellent flatness and reading of data is achieved at a low rate of occurrence of error.

To accomplish the above objects there is proposed according to one aspect of the present invention a method of producing an optical or magneto-optical recording card comprising the steps of adhering a transfer type optical recording medium to the one surface of a protective layer with the use of an adhesive, the transfer type optical recording medium comprising a base film, a peeling layer, an optical recording layer and a light permeability adhesive layer which are successively superimposed one above another, removing the base film from the transfer type optical recording medium by peeling operation, and then adhering a card base layer to the protective layer in such a manner that the optical recording layer is held therebetween, the optical recording layer being adhered to the protective layer.

Further, there is proposed according to other aspect of the present invention a transfer type optical recording medium comprising a base film, a peeling layer, an optical recording layer which are successively superimposed one above another to constitute a layered structure.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings; in which.

DESCRIPTION OF THE PREFERRED EMBODIMENTS

Now, the present invention will be described in a greater detail hereunder with reference to the accompanying drawings which illustrate a preferred embodiment thereof.

First, description will be made as to transfer type optical or magneto-optical recording medium which is employed, for practicing the method of producing an optical or magneto-optical recording card in accordance with the invention.

Figure 1:
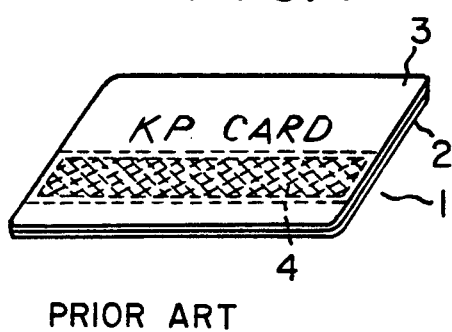
FIG. 1 is an illustrative perspective view of an optical recording card.
Figure 2:
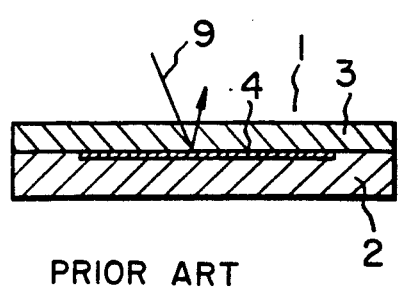
FIG. 2 is a schematic vertical sectional view of the optical recording card.
Figure 3:
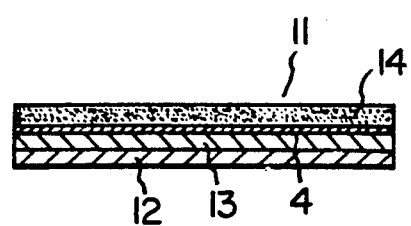
FIG. 3 is a schematic vertical sectional view of a transfer type optical recording medium.

In FIG. 3 reference numeral 11 designates a transfer type optical recording medium. Specifically, the transfer type optical recording medium is constituted in such a manner that a peeling layer 13 is formed on the base film 12 by employing a peeling process, an optical recording layer 4 is formed on the peeling layer 13 and an adhesive layer 14 is then formed on the optical recording layer 4.

The base film 12 is constructed by polycarbonate, polyethyleneterephthalate, polyimide, polyamide, polysulfone, polyethersulfone, polyetherketone, polyethenetherketone or polyetherimide and has a thickness in the range of 5 to 100 microns, preferably in the range of 10 to 50 microns.

Next, the optical recording layer 4 is constructed by superimposing the optical recording material layer on a pattern support layer. The optical recording material layer is supported on the pattern support layer.

Figure 4:
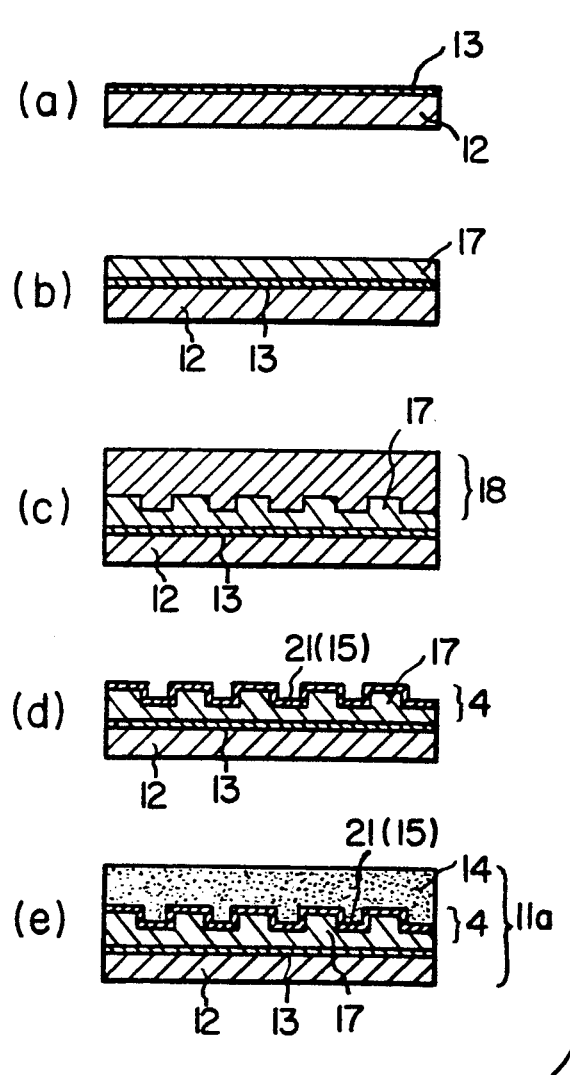
FIG. 4 is a series of vertical sectional views illustrating an example of process of producing a transfer type optical recording medium.
Figure 5:
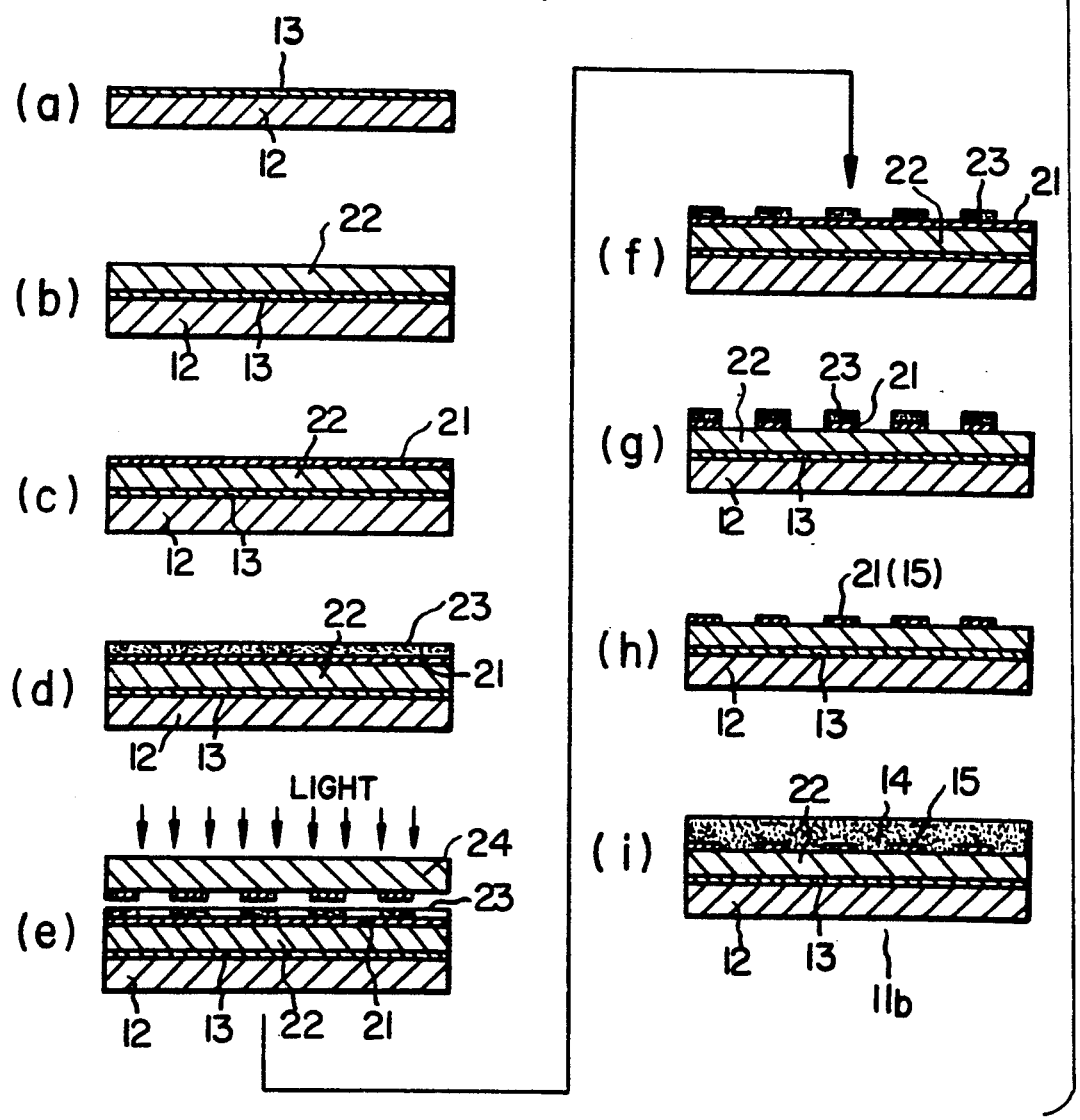
FIG. 5 is a series of vertical sectional views illustrating other example of process of producing a transfer type optical recording medium.

The optical recording layer 4 is formed on the peeling layer 13 and has an optical reflective layer 15 which includes a number of data pits which can be read (see FIGS. 3, 4 and 5). The optical recording layer 4 is so formed that data are recorded in dependence on existence of the readable optical recording material layer or not or by generating phase difference of reading light due to provision of ruggedness on the optical recording material layer.

The pattern support layer is constructed by acryl-based resin, vinyl-based resin, Cellulose-based resin, polyester-based resin, polyurethane-based resin, epoxy-based resin, alkyd-based resin or amino-based resin and has a thickness in the range of 0.5 to 100 microns, preferably in the range of 1 to 50 microns. Generally, the pattern support layer is formed by roll coating or the like process.

The optical recording layer 14 has a thickness in the range of 50 to 2000 A and is constructed by metallic material such as Te, Bi, In, Pb, Sn, Sb, Zn, Se, Cd, Ga, Ag, Au, Cu, Cr, Al or their alloy, or has a thickness in the range of 100 A to 10 microns and is constructed by organic and/or inorganic compound material such as Te-C, Te-$CS_2$, Bi-$CS_2$, Te-teflon, Ag-gelatine or multilayer film such as Te-dyestuff, Te-nitro cellulose, metallic film-dielectric film, or has a thickness in the range of 100 A to 10 microns and is constructed by dyestuff film such as cyanine dye, phthalocyanine, naphthoquinone dye or has a thickness in the range of 100 A to 10 microns and is constructed by compound material of organic material and dye such as nitrocellulose styrene, acetic acid vinyl, gelatine and dyestuff sub-oxide such as $TeO_x$, $GeO_x$, $SbO_x$, $MoO^x$ or the like, layered material of metallic material and organic material such as AuPt-(PS, PMMA or PVAC), or magneto-optical film Al-teflon material such as MnCuBi, CdCo, TbCo, TbFe, GdTbFe, TbFeCo. It should be noted that in order to form the optical recording material layer, a technique suitable for producing a film is employable in consideration of the kind of the optical recording material.

With respect to reading light visual light such as near-infrared, while light, tungsten light or the like is preferable. Alternatively, infrared or ultraviolet may be employed.

The adhesive layer 14 is formed by coating transparent synthetic resin adhesive on the optical recording layer 4 by employing roll coat, flow coat or the like and then drying it. The adhesive layer 14 is constructed by copolymer of polychloride vinyl-acetic acid vinyl, polyurethane resin, polyester resin or the like transparent thermoplastic resin.

The peeling layer 13 is formed by employing flow coat, gravure coat or the like and it is constructed by silicone resine, silicone oil, acryl-based resin, cellulose-based resin or vinyl-based resin and has a thickness less than one micron.

Next, description will be made below as to a method of producing transfer type optical recording medium with reference to FIGS. 4 to 6.

FIGS. 4(a)-(e) illustrates a plurality of steps of producing transfer type optical recording medium 11a in the case where the optical recording layer 4 is formed by a stamping method.

Specifically, the upper surface of the base film 12 is subjected to peeling process to form a peeling layer 13 (a step of peeling treatment) (see FIG. 4(a)).

Next, a shaping resin layer 17 which serves as a pattern support layer is formed on the peeling layer 13 by coating UV hardened resin or the like on the peeling layer 13 (a step of coating shaping, resin ) (see FIG. 4(b)). The shaping resin layer 17 can also serve as a peeling layer. In this case the step of forming peeling layer 13 as shown in FIG. 4 is not required. FIG. 4(a) is not required.

Next, a stamper 18 which is previously formed with a rugged pattern of the optical recording layer 4 is pressed on the shaping resin layer 17 whereby the rugged configuration of the stamper 18 is transferred onto the shaping resin layer 17 and the latter is caused to harden (a step of shaping) (see FIG. 4(c)).

Next, a reflective layer 21 which serves as an optical recording material layer is formed by vacuum depositing on the shaping resin layer 17, for example, metallic material having high reflectivity such as aluminum or the like. The thus formed reflective layer 21 has the same ruggedness as the stamper 18 and phase difference of reflected light is produced in accordance with difference in position between projected portion and recessed portion whereby required informations can be read optically (a step of coating the reflective layer) (see a step 4(d)).

Next, an adhesive layer 14 is formed on by coating transparent adhesive on the reflective layer 21 (a step of coating an adhesive) (see FIG. 4(e)).

A transfer type optical recording medium 11a is produced by way of the steps as mentioned above.

FIGS. 5(a)-(i) illustrates a plurality of steps of producing transfer type recording medium 11b in the case where the optical recording layer 4 is formed by an etching method.

Specifically, the upper surface of the base film 12 is subjected to peeling process to form a peeling layer 13 (a step of peeling treatment) (see FIG. 5(a)).

Next, an optical pattern support layer 22 comprising a resin having high light absorptivity or high permeability relative to reading light is formed on the peeling layer 13 (a step of forming an optical pattern support layer 22) (see FIG. 5(b)).

The optical pattern support layer 22 serves to support a reflective layer 21 which has shortage in mechanical strength by itself and increases smoothness of the reflective layer 21. Further, it is possible to have high absorptivity or high permeability relative to reading light.

Further, by increasing adhesiveness between the reflective layer 21 and the optical pattern support layer 22 it becomes easier to carry out writing (in the form of etching or the like).

Generally, the etching process or a resist lift-off process to be described later is practiced by utilizing the portion where a reflective film is existent and the portion where any reflective film is not existent as data. Thus, to assure increased S/N it is necessary that contrast is enlarged. Accordingly, it is required that the support layer has high absorptivity or high permeability relative to reading light.

It should be noted that the optical information pattern support layer 22 can have a function as peeling layer. In this case the step of peeling treatment as shown in FIG. 5(a) is not required.

Next, a reflective layer 21 comprising metallic material having high reflectivity relative to reading light is formed on the optical pattern support layer 22 by vacuum depositing or the like process (a step of coating a reflective layer 21 (FIG. 5(c)).

Next, resist 23 is coated on the reflective layer 21 by roll coating (a step of coating resist) (FIG. 5(d)). The resist 23 may be either of positive type or of negative type.

Next, a mask 24 having a pattern representative of optical information is placed on the resist 23 in close contact therewith and it is exposed to light beam (a step of allowing the mask to be exposed to light beam) (FIG. 5(e)).

Next, the thus exposed resist 23 is developed. This enables the optical information pattern to be transferred to the resists 23 whereby a rugged configuration corresponding to the optical informations is produced on the resist 23. The recessed part has no resist due to removal of the latter, causing the surface of the reflective layer 21 to be exposed to the outside but the residual part of the reflective layer 21 is coated still with the resist 23 (a step of developing) (see FIG. 5(f)).

Next, the reflective film 21 is subjected to etching from the above of the resist 23. This leads to a result that the part of the reflective layer 21 which is not coated with the resist 23 is removed and thereby the surface of the optical pattern support layer 22 is exposed to the outside whereas the part of the reflective layer 21 which is coated with resist 23 resides on the surface of the optical pattern support layer 22 with the resist while maintaining the vacuum deposited state (a step of etching) (see FIG. 5(g)).

Next, the residual resist is removed (a step of removal) (see FIG. 5(h)).

Next, transparent adhesive is coated from the above of the optical reflective layer 15 including the residual reflective layer 21 to constitute an adhesive layer 14 (a step of coating an adhesive) (see FIG. 5(i)). Thus, a transfer type optical recording medium 11b is obtained.

Figure 6:
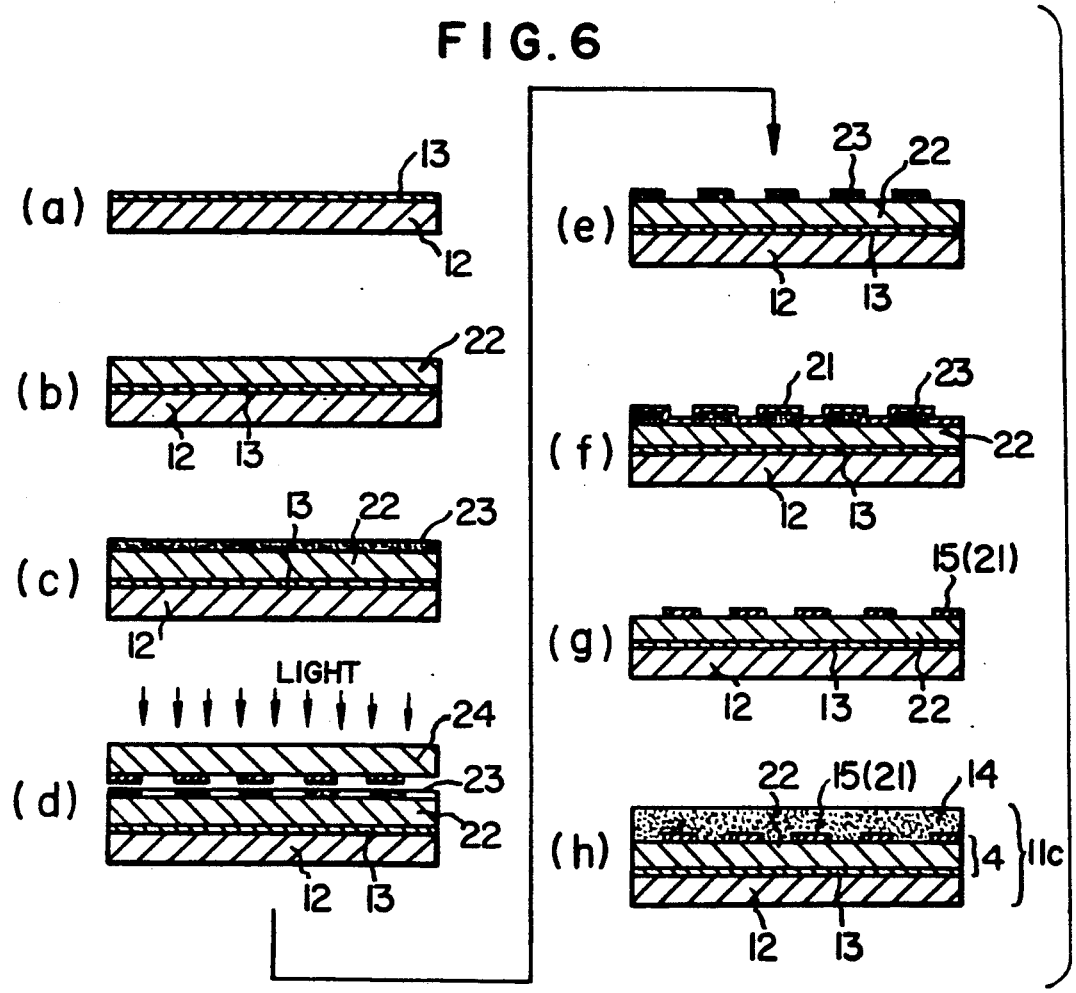
FIG. 6 is a series of vertical sectional views illustrating another example of process of producing a transfer type optical recording medium.

FIG. 6 illustrates a plurality of steps of producing transfer type optical recording medium 11c in the case where the optical recording layer 4 is formed in accordance with the resist lift-off process.

Specifically, the upper surface of the base film 12 is subjected to peeling process to form a peeling layer 13 (a step of peeling treatment) (see FIG. 6(a)).

Next, an optical pattern support layer 22 comprising a resin having high light absorptivity or high permeability relative to reading light is formed on the peeling layer 13 (a step of forming an optical support layer) (see FIG. 6 (b)).

The optical pattern support layer 22 can serve as a peeling layer. In this case the step of peeling as shown in FIG. 6(a) is not required.

Next, resist is placed on the optical pattern support layer 22 by employing a spin coating process (a step of resist coating) (see FIG. 6(c)). The resist 23 may be either of positive type or of negative type.

Next, a mask 24 having a pattern representative of optical informations is placed on the resist 23 in close contact therewith and it is then exposed to light beam (a step of allowing the mask to be exposed to light beam) (see FIG. 6(d)).

Next, the thus exposed resist 23 is developed. This enables the optical pattern to be transferred to the resist 23 whereby a rugged configuration corresponding to the optical s is produced on the resist 23. The recessed part has no resist due to removal of the latter, causing the surface of the optical pattern support layer 22 to exposed to the outside but the residual part of the optical pattern support layer 22 is coated still with the resist 23 (a step of developing) (see FIG. 6 (e)).

Next, a reflective layer 21 comprising metallic material having high reflectivity relative to light is formed on the resist 23 by vacuum depositing (a step of coating a reflective film) (see FIG. 6 (f)).

Next, the resist 23 is removed by a lift-off process. Thus, the part of the reflective layer 21 located on the resist 23 is removed together with the resist 23 whereby the surface of the optical pattern support layer 22 becomes exposed to the outside. On the other hand, the part of the reflective layer 21 which is not located on the resist 23 resides in such a state that it is vacuum deposited on the surface of the optical pattern support layer 22 whereby an optical reflective layer 15 is built (a step of lift-off) (see FIG. 6(g)).

Next, transparent adhesive is coated from the above of the residual reflective layer 21 (optical reflective layer 15) to form an adhesive layer 14 (a step of coating an adhesive) (see FIG. (h)).

A transfer type optical recording medium 11c is produced by way of the steps as mentioned above.

Incidentally, the optical pattern as mentioned above may be either preformatting pit pattern or data pit pattern.

Next, description will be made below as to a method of producing an optical recording card using a transfer type optical recording medium 11 (11a, 11b, 11c) which is constructed in the above-described manner.

Figure 7:
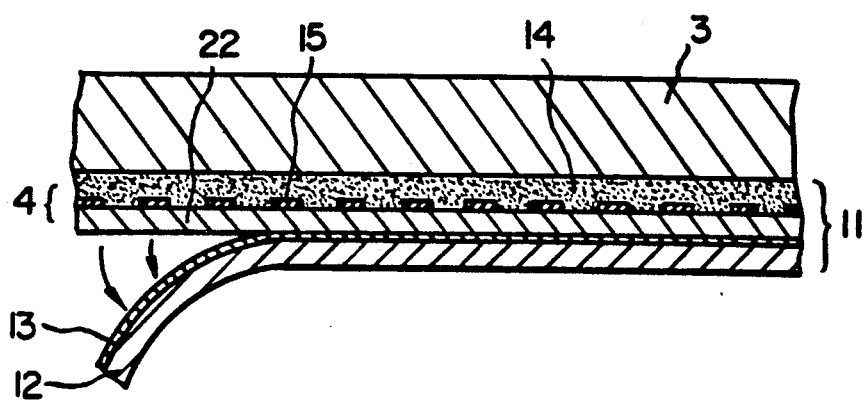
FIG. 7 is a fragmental enlarged vertical sectional view of a transfer type optical recording medium, particularly illustrating that the base film is peeled off.

First, as shown in FIG. 7, a protective layer 3 comprising plastics or the like having high permeability such as polycarbonate or the like is previously provided and a transfer type optical recording medium 11 is superimposed one above another with an adhesive layer 14 superimposed therebetween. Thereafter, heat and pressure are applied to the thus superimposed structure so as to allow the protective layer 3 and the transfer type optical recording medium 11 to be adhesively connected to one another and after completion of adhesive connection the base film 12 is peeled off together with, the peeling layer 13.

Alternatively, the protective layer 3 may be adhesively superimposed on the transfer type optical recording medium 11 after the peeling layer 13 is peeled off from the latter. When the base film 12 is peeled off, the peeling layer 13 may be located on the base film 12 or it may reside on the optical pattern support layer 22.

Figure 8:
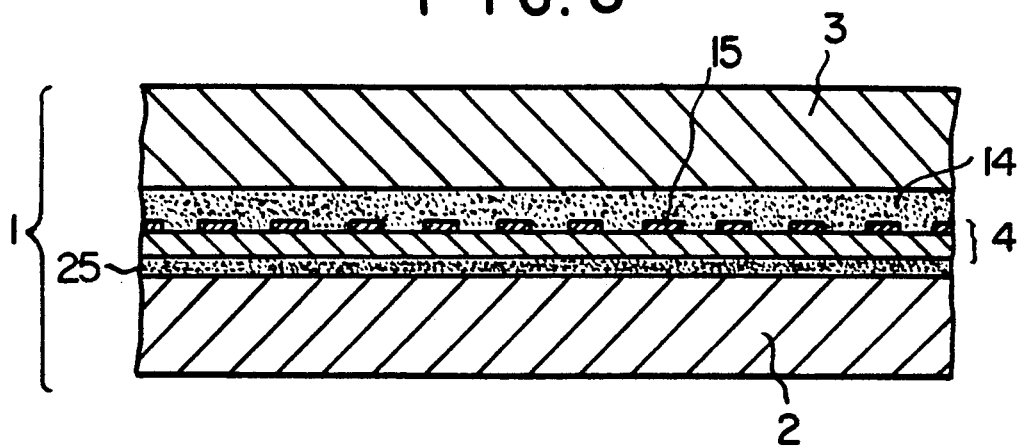
FIG. 8 is a fragmental enlarged vertical sectional view of an optical recording card.
Figure 9:
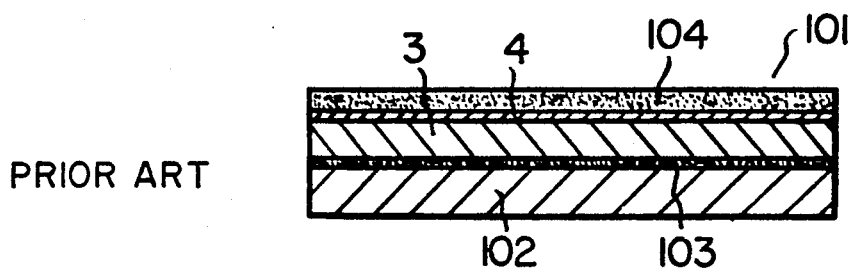
FIG. 9 is a schematic vertical sectional view illustrating a conventional transfer type optical recording medium.
Figure 10:
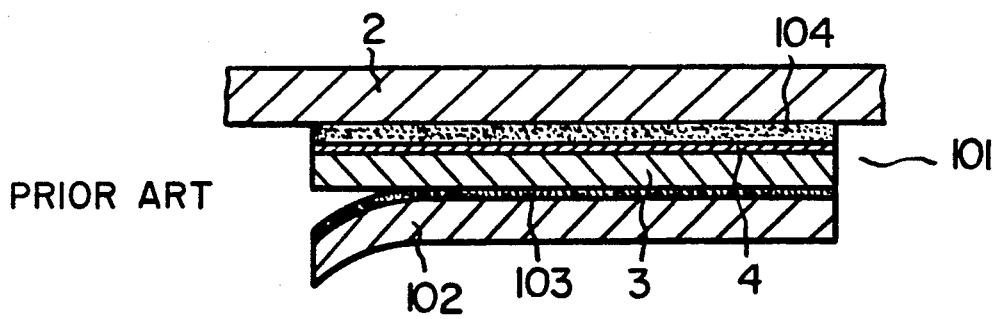
FIG. 10 is a fragmental enlarged vertical sectional view of the conventional transfer type optical recording medium, particularly illustrating that the base film is peeled off.
Figure 11:
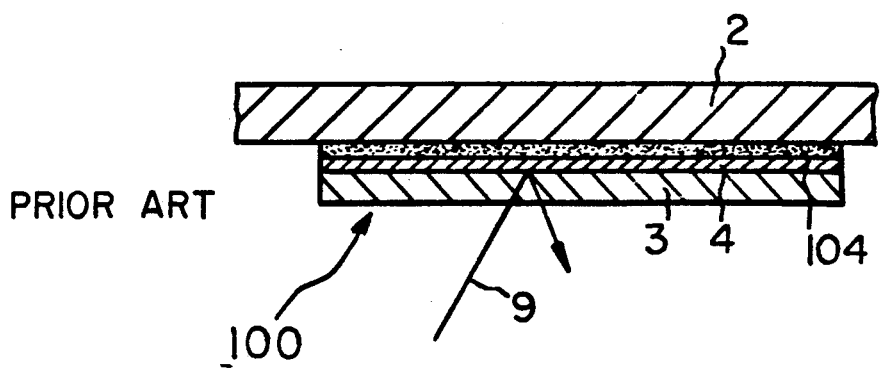
FIG. 11 is a schematic vertical sectional view of a conventional optical recording card.

The thus obtained superimposed structure comprising the optical recording layer 4 and the protective layer 3 is further superimposed on a card base 2 in such a manner that the optical recording layer 4 and an adhesive layer 25 are interposed therebetween. Thus, an optical recording card 1 as shown in FIG. 8 is obtained.

EXAMPLE

As a protective layer polycarbonate having a thickness of 0.5 mm was used, while as a card base white and hard polyvinylchloride having a thickness of 0.25 mm of which adhesive surface was coated with urethane-based adhesive having a thickness of 5 microns was used. A transfer type optical recording medium was temporarily attached to a part of a protective layer using a hot plate made of metallic material, rubber bard, rubber roll or the like each of which was heated to about 100° C. It should be noted that at this moment only slight pressing force was required to such an extent that the transfer type optical recording medium was temporarily secured to the protective layer and therefore it was not required that the former was fixedly secured to the latter. After completion of temporal adhesive securing the base film was peeled off. The protective layer and the card base were thermally adhered to one another in such a manner that they were clamped between mirror surface plates. At this moment the optical recording layer was interposed between the protective layer and the card base. Thermal adhering was achieved at pressure of 30 Kg/cm$^2$ and temperature of 110° C. for a period of time of 10 minutes. Thereafter, heating was interrupted and cooling was effected for a period of time of 15 minutes using water. Finally, the material was cut to dimensions corresponding to a card. Thus, a required card was obtained.

Advantageous Effects of the Invention

The present invention offers the following advantageous effects.

According to the method of producing an optical recording card using a transfer type optical recording medium as constructed in the above-described manner it is possible to attach the optical recording medium to a card by transferring operation. In consequence, producing of the optical recording card can be effected at a high productive efficiency. Since the peeling layer of the base film is located opposite to the reading side of the optical recording layer, it is assured that residual foreign material relative to the peeling layer does not hinder entrance and reflection of reading light and no contamination takes place due to adherence of dust or the like to the residual foreign material of the peeling layer.

Further, since the transfer type optical recording medium of the invention does not have any hard and thick protective layer, it is possible to form the transfer type optical recording medium in tape-shape. This means that the transfer type optical recording medium can be wound about a reel. Therefore, it is easy to handle the transfer type optical recording medium during a step of producing an optical recording card. Further, since the protective layer can be reserved or treated separately from the transfer type optical recording medium, there is no fear of injuring or degrading the protective layer with the result that an optical recording card can be obtained with a rate of occurrence of error during data reading being minimized.

Since a transfer type optical recording medium can be preserved at all time regardless of how a thickness of the protective layer differs from product to product, all that is required is to adhere it to a protective layer having a predetermined thickness in response to the specification of a product. Accordingly, a countermeasure against change in thickness of the protective layer of a product can be taken quickly. Further, in the case where a protective layer has the same size as a card base and a transfer type optical recording medium is prepared smaller than the protective layer, it is very easily achieved by preparing the transfer type optical recording medium separately from the protective layer in accordance with the present invention that an optical recording layer is kept in a closely sealed state within the optical recording card while the protective layer and the card base are fused together along the peripheral part of the optical recording card.

Thus, it is possible to prevent the optical recording layer from being oxidized or deteriorated under the influence of outside atmosphere by holding the optical recording layer between the protective layer and the card base in a closely sealed state. Moreover, it is possible to prevent an occurrence of peeling off from the card edge portion.

While the present invention has been described above with respect to a few preferred embodiments thereof, it should of course be understood that it should not be limited only to them but various changes or modifications may be made in a suitable manner without departure from the spirit and scope of the invention as defined by the appended claims.

What is claimed is:

1. A method of producing transfer type optical or magneto-optical recording medium comprising the steps of:

forming a peeling layer on the one surface of a base film, forming a pattern support layer on said peeling layer, forming an optical or magneto-optical recording material layer on said pattern support layer, and forming light permeable adhesive layer on said optical or magneto-optical recording material layer, said pattern support layer comprising acryl-based resin, vinyl-based resin, cellulose-based resin, polyester-based resin, polyurethane-based resin, epoxy-based resin, alkyd-based resin or amino-based resin and has a thickness in the range of 0.5 to 100 microns.

2. A method as claimed in claim 1, wherein said base film formed of polycarbonate, polyethyleneterephthalate, polyimide, polyamide, polysulfone, polyethersulfone, polyetherketone, polyetheretherketone or polyetherimide and has a thickness in the range of 1 to 100 microns.

3. A method as claimed in claim 1, wherein said peeling layer formed of silicone-based resin, silicone oil, acryl-based resin, cellulose-based resin or vinyl-based resin and has a thickness less than one micron.

4. A method as claimed in claim 1, wherein
   said optical or magneto-optical recording layer has a thickness in the range of 50 to 2000 angstroms and comprises metallic material selected from the class of materials consisting of Te, Bi, In, Pb, Sn, Sb, Zn, Se, Cd, Ga, Ag, Au, Cu, Cr, Al or selected from the class of materials consisting of their alloy, or has a thickness in the range of 100 angstroms to 10 microns and comprises compound material of organic and/or inorganic material selected from the class of materials consisting of Te-C, Te-CS$_2$, Bi-CS$_2$, Te-teflon, Ag-gelatine or multilayer film selected from the class of materials consisting of Te-dyestuff, Te-nitrocellulose, metallic material film-dielectric material film, or has a thickness in the range of 100 angstroms to 10 microns and is constructed by dyestuff film such as cyanine dye, phthalocyanine, naphtho quinone dye or has a thickness in the range of 100 angstroms to 10 microns and is constructed by compound material of organic material selected from the class of materials consisting of nitrocellulose, polystyrene, polyvinylacetate, gelatin and dyestuff, and sub-oxide selected from the class of materials consisting of TeOx, GeOx, SbOx, NoOx or layered material of metallic material and organic material selected from the class of materials consisting of AuPt-(polystyrene, polymethylmethacrylate or polyvynylacetate) or Al-teflon or magnetic film material selected from the class of materials consisting of MnCuBi, CdCo, TbCo, TbFe, GdTbFe, TbFeCo.

5. A method as claimed in claim 1, wherein
   said adhesive layer is formed of transparent thermoplastic resin selected from the class of materials consisting of vinyl chloride-polyvinylacetate copolymer, polyurethane resin, and polyester resin.

* * * * *